(12) United States Patent
Nlebedim et al.

(10) Patent No.: US 12,624,416 B2
(45) Date of Patent: May 12, 2026

(54) RARE EARTH LASER-ASSISTED METAL PRODUCTION AND SEPARATION

(71) Applicant: Iowa State University Research Foundation, Inc., Ames, IA (US)

(72) Inventors: Cajetan Ikenna Nlebedim, Ames, IA (US); Abhishek Sarkar, Kanpur (IN); Pranav Shrotriya, Ames, IA (US); Denis Prodius, Ames, IA (US); Ho-won Noh, Ames, IA (US); Thomas Lograsso, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 610 days.

(21) Appl. No.: 17/803,831

(22) Filed: Dec. 14, 2022

(65) Prior Publication Data

US 2023/0212709 A1 Jul. 6, 2023

Related U.S. Application Data

(60) Provisional application No. 63/361,516, filed on Dec. 29, 2021.

(51) Int. Cl.
| | |
|---|---|
| *C22B 4/08* | (2006.01) |
| *B01J 19/12* | (2006.01) |
| *C22B 4/04* | (2006.01) |
| *C22B 59/00* | (2006.01) |

(52) U.S. Cl.
CPC .............. *C22B 4/08* (2013.01); *B01J 19/121* (2013.01); *C22B 4/04* (2013.01); *C22B 59/00* (2013.01); *B01J 2219/12* (2013.01)

(58) Field of Classification Search
CPC ............. B01J 19/121; C22B 4/04; C22B 4/08
See application file for complete search history.

(56) References Cited

U.S. PATENT DOCUMENTS

| | | | | |
|---|---|---|---|---|
| 4,172,775 | A | * 10/1979 | Donohue | ................ C22B 60/04 204/157.4 |
| 11,633,807 | B2 | 4/2023 | Thuo et al. | ..................... 26/342 |
| 2021/0207242 | A1 * | 7/2021 | Payeur | ................... H01J 49/30 |

OTHER PUBLICATIONS

U.S. Geological Survey, Mineral Commodity Summaries, 2018.
N. Swain et al, A review on the recovery and separation of rare earths and transition metals from secondary resources, Journal of Cleaner Production, 220, pp. 884-898, 2019.
A.Abbasalizadeh et al, Electrochemical Extraction of Rare Earth Metals in Molten Fluorides: Conversion of Rare Earth Oxides into Rare Earth Fluoride Additives, J. Sustain. Metall., 3, pp. 627-637, 2017.
F.H. Spedding et al, United States Atomic Energy Commission, Preparation of Rare Earth Metals, Jun. 1951.
Banerjee, Souvik, Asymmetric mass transfer across disparate material systems, PhD thesis, Chapter 1, 1.3 Part 2 (pp. 8-10) and Chaper 4 (pp. 76-96), Nov. 8, 2022.

\* cited by examiner

*Primary Examiner* — Ricardo D Morales

(57) ABSTRACT

A compound or complex containing a rare earth element is impinged with a pulsed laser that is so controlled as to photochemically reduce and obtain a rare earth metal (REM). A mixture of REM salts can be impinged using laser light tuned to selectively reduce a particular rare earth-containing salt of the mixture to separate out as its respective rare earth metal.

19 Claims, 3 Drawing Sheets

Sample 10 14

12

Sample     10     14

12

Point-to-line Lens
System

Converted product

Operating
Interface

Material Feed

Platform

Laser source

Roller Feed-through

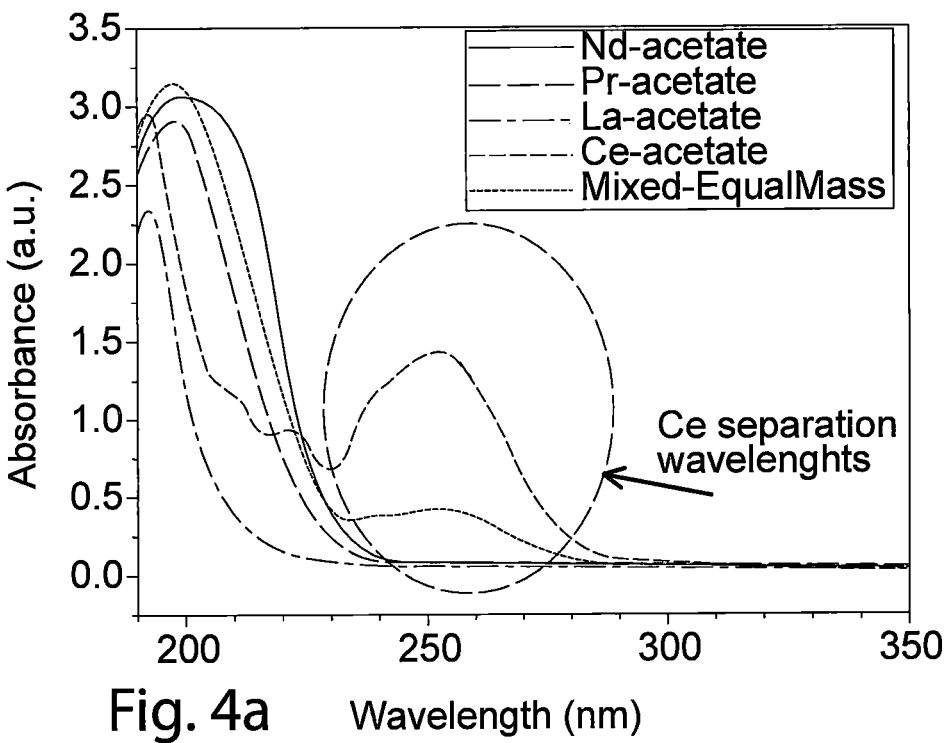
Fig. 4a    Wavelength (nm)
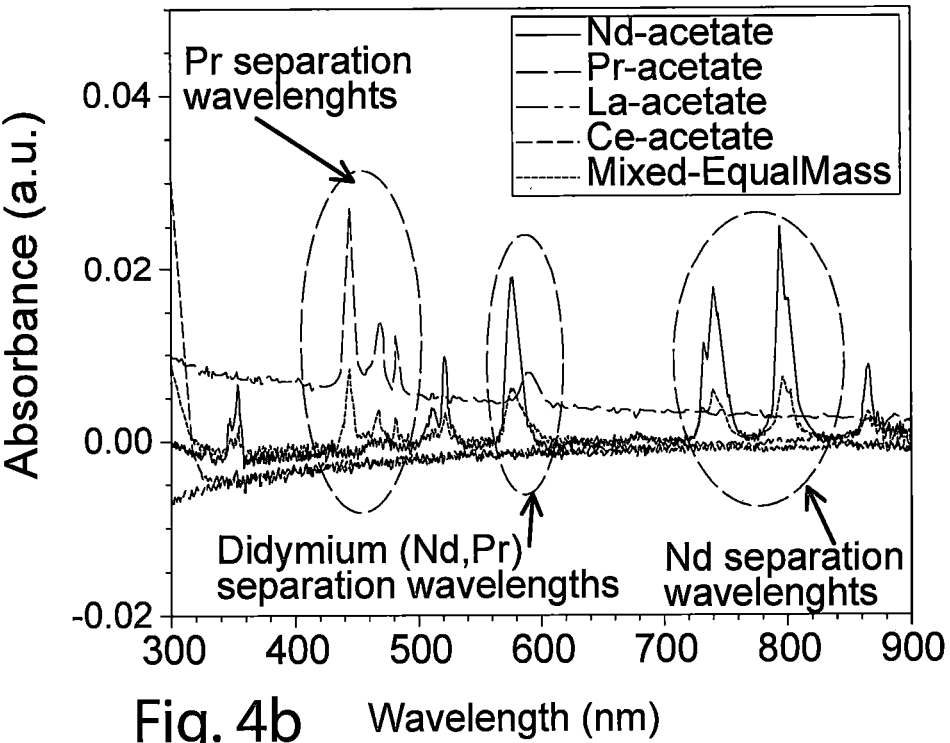
Fig. 4b    Wavelength (nm)

RARE EARTH LASER-ASSISTED METAL PRODUCTION AND SEPARATION

This invention was made with government support under Grant No. DE-AC-02-07CH11358 awarded by the U.S. Department of Energy. The government has certain rights in the invention.

FIELD OF THE INVENTION

The present invention relates to method and apparatus for producing a rare earth metal from a compound or complex containing a rare earth element or from a mixture thereof.

BACKGROUND OF THE INVENTION

Rare earth elements (REEs) are crucial for our modern society, and the resiliency of their supply chains is essential for the nation's technological advancement, energy security, economic prosperity, and defense. Electric vehicles (EVs) can significantly reduce greenhouse gasses and help achieve the transition to a net-zero economy by 2050. Still, such achievement will depend on substantial advancement in rare earth metal (REM) production technologies. Apart from their many other applications, REMs is a key component of EVs, wherein REMs are needed for the drivetrains. In 2019, 80% of REE-containing compounds consumed in the U.S. were imported. Some domestically sourced REEs are shipped and further processed abroad due to lack of domestic processing facilities.

Separation of rare earth elements is an essential step towards their reduction to rare earth metals for practical applications. It is an important purification step, the product of which are typically oxides that are further subjected to reduction processes to obtain the desired metal. The need for separation also arises for recycled rare earth products in which they are typically recovered as mixed salts or oxides which, again, requires subsequent reduction to obtain the desired metals for applications, e.g., permanent magnets development.

The industrial separations process involves leaching, followed by a selective extraction. The leaching processes require strong oxidizing/harsh chemicals for dissolution of rare earth concentrates or recycled products which pose a significant environmental impact towards disposal of acidic waste effluents. Also, operating conditions for the different separation processes vary depending on feedstock type, making them economically taxing.

For metal production, the commercial methods involve metallothermic and electrolytic reduction of REE salts and oxides. For example, calciothermic methods require REE halides or oxides, followed by thermic reduction using Ca in an inert atmosphere. The need for high-temperature results in an energy-intensive process; fluorination is operationally risky due to the typical need for HF and hydrogen evolution. Moreover, achieving high purity and high yield in the process appear to be mutually exclusive. All these make the process costly. Although $NdCl_3$ has been proposed as a substitute for $NdF_3$, it is limited by high hygroscopicity, hence low yield and high impurities. Also, molten salt electrolytic reduction processes have poor yield and scalability. Moreover, the logistics of both REE separation and metal reduction being performed by different companies with different business focuses and technological capabilities, result in increased costs which subsequently impacts the price of the final product. This is exacerbated by the current state-of-the-art separation and reduction processes being energy intensive, environmentally taxing, requiring substantial amounts of hazardous chemicals and producing significant amounts of solid and liquid wastes. There is a need for an improved method to obtain one or more REMs from compounds, complexes, etc., containing one or more REEs. This need is better addressed if metal reduction is a means for separation.

SUMMARY OF THE INVENTION

Certain embodiments of the present invention provide a rare earth laser-assisted metal production and separation (RELAMPS) technology by photochemical selective reduction of various REE-containing compounds and complexes as well as others using a pulsed laser wherein such other compounds and complexes include, but are not limited to La, Ce, Pr, Nd, Pr, Sm, Eu, Gd, Tb, Dy, Ho, Er, Tm, Yb and Lu.

Certain embodiments of the present invention employ a pulsed laser to implement the selective reduction (separation) process at room temperature. The pulsed laser light is impinged and controlled to selectively dissociate molecular bonds in REE oxides, oxalates, halides and other compounds and complexes.

Practice of embodiments of the present invention is advantageous in that an infinitesimally small time-period for bond cleaving and energy transport using a picosecond and femtosecond laser prevents loss of energy makes practice of method embodiments very efficient. Consequently, instead of the typically required high temperatures (>800° C.) heretofore employed, practice of method embodiments can achieve separation of REE-containing compounds and complexes by reduction to REMs (rare earth metals) at ambient temperature conditions and excludes the use of harsh chemicals. Moreover, the versatility of laser irradiation of a REE-containing compound or complex at different frequencies provides a unique advantage in that UV lasers induce large energy to dissociate strong molecular bonds such as REE oxides and halides but have low penetration depth. IR lasers are more suitable for weaker bonds like REE hydroxides and oxalates but have larger penetration depths. Practice of embodiments of the present invention will not only enable improvement in availability of REMs, but also have a reduced energy and carbon footprint, compared to traditional processes.

Certain other embodiments of the present invention involve using RELAMPS technology to separate out certain rare earth metal(s) from a mixture of rare earth element-containing compounds and complexes (e.g. rare earth salts) using tunable pulsed laser light tuned to a wavelength to selectively reduce a certain rare metal compound or compound of the mixture to its respective rare earth metal.

The above objects and advantages of practice of the present invention will become more readily apparent in view of the following detailed description with the following drawings.

BRIEF DESCRIPTION OF THE DRAWINGS

FIGS. 2a and 2b show images of a sample after RELAMPS processing wherein FIG. 2a shows laser-treated and untreated areas of the sample and FIG. 2b shows metallic luster of the laser-treated area.

FIGS. 4a and 4b are plots of UV-Vis spectra for various rare earth acetates listed in the figures demonstrating selective excitation peaks for use in selecting wavelength(s) for separation of Ce metal (FIG. 4a) and of Pr metal and Nd metal (or as an metal alloy thereof) (FIG. 4b).

DETAILED DESCRIPTION OF THE INVENTION

Certain embodiments of the present invention illustrate use of a controlled pulsed laser light impingement to achieve a selective reduction (separation) process are described in detail below for purposes of illustration and not limitation wherein rare earth element-containing hydroxides, oxides and oxalates such as $Nd(OH)_3$, $Nd_2(C_2O_4)_3$, and $(Nd_{0.75}Pr_{0.25})_2(C_2O_4)_3$, and $Gd_2(C_2O_4)_3$, and others represented by $(Nd1-xPrOx)_2(C_2O_4)_3$, at room temperature are impinged by pulsed laser light controlled to selectively dissociate the constituents to yield a REM (rare earth metal), which can comprise at least one of La, Ce, Pr, Nd, Pr, Sm, Eu, Gd, Tb, Dy, Ho, Er, Tm, Yb and Lu. The Examples are offered for purposes of illustration and not limitation since embodiments of the present invention can be practiced with respect to other rare earth element-containing compounds, complexes and other material that contain a rare earth element bonded in a manner that can be dissociated by impingement of the material by properly controlled pulsed laser light to this end.

EXAMPLES

Embodiments of the RELAMPS method have been demonstrated with Nd and Gd salts using the laser processing chamber shown in FIG. 1, in which chamber a cold pressed, powder pellet cube-shaped sample ("Sample") is positioned on a titanium pedestal below a quartz (fused silica, 1064 nm permeable) window 10 as shown prior to laser conversion. The RELAMPS method has been demonstrated by pulsed laser treatment on pellets of $Nd(OH)_3$, $Nd_2(C_2O_4)_3$, and $(Nd_{0.75}Pr_{0.25})_2(C_2O_4)_3$, and $Gd_2(C_2O_4)_3$ in the controlled atmosphere laser processing chamber under $N_2$ blanket and at 1 mbar pressure (sub-atmospheric pressure) with inlet 12 for $N_2$ gas entry to the chamber and outlet 14 for chamber evacuation by vacuum pumping. Other alternate blanket gases can be used in lieu of nitrogen such as argon, helium, and others. A 1064 nm, 12 ps Nd-YAG pulsed laser positioned outside the chamber was used with 3 W power for the conversion process with its beam scanned through the quartz window 10 across the sample in lines of 15 mm length with a scan speed of 2 mm/s and a line spacing of about 128 μm, which are parameters that can be optimized for specific systems. In the Example, the laser beam did not go through the entire pellet sample only because the available laser system could not achieve full penetration. For example, the pellet samples (10 mm cubes) for laser treatment were 300-400 microns in thickness; yet the available laser beam penetrated to 100-200 microns. A more powerful pulsed laser system can be chosen to overcome this limitation of the Examples.

Figure 1:
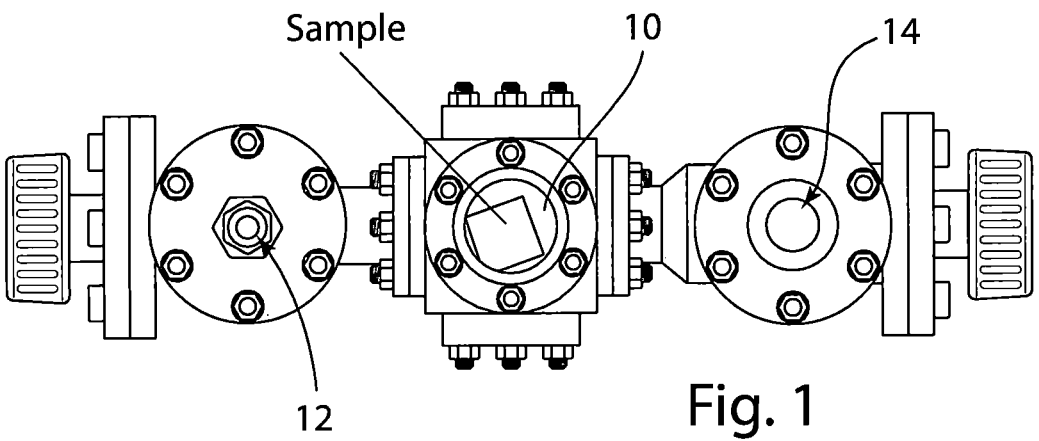
FIG. 1 illustrates a processing chamber designed for the application of RELAMPS.
Figure 2A:
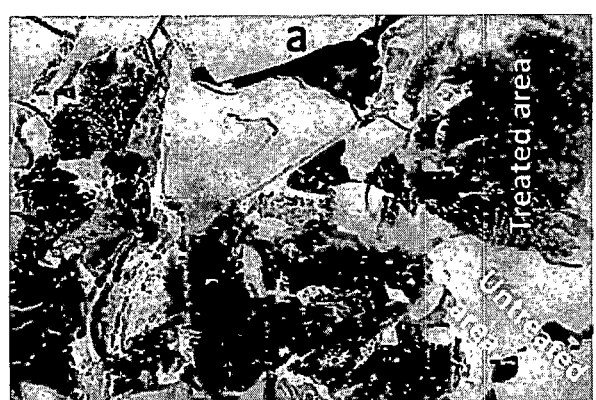
Figure 2B:
Figure 2C:
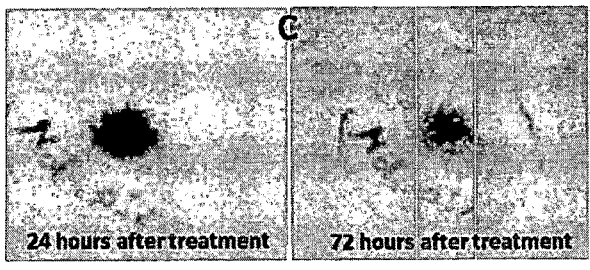
FIG. 2c shows a sample left in air after 24 and 72 hrs. that started to re-convert to the original oxide/hydroxide state.

For the Nd salt samples (i.e. $Nd(OH)_3$), the starting hydroxide pellet powder sample, FIG. 1, was converted into a dark metal powder after laser treatment using the 1064 nm, 12 ps Nd-YAG pulsed laser. To this end, FIG. 2a shows laser-treated and untreated areas of a sample. FIG. 2b (with metallic luster) shows metal sample from the laser treated area which also reveals the laser tracks during the processing. FIG. 2c shows a sample that was exposed to air for 24 hrs. and 72 hrs. and was observed to re-convert to the original hydroxide/oxide form. As a result, the laser-treated sample needs to be kept in inert atmosphere to prevent oxidation. That includes handling, storage and transportation in inert atmosphere chambers. However, this becomes less of a concern if the result REM powder is melted into an ingot.

Similar results using the same pulsed laser parameters, i.e. wavelength 1064 nm, pulse width 12 ps and scan speed 2 mm/s, were obtained for the laser-treated samples of $Nd_2(C_2O_4)_3$, and $(Nd_{0.75}Pr_{0.25})_2(C_2O_4)_3$, and $Gd_2(C_2O_4)_3$ where $Nd^0$ metal and $Gd^0$ metal were obtained at the laser-treated areas.

For the Gd oxalate ($Gd_2(C_2O_4)_3$) samples, since Gd metal has a Curie point near room temperature (293 K), it was possible to use ferromagnetism as a signature of metal production. Coercivity in the magnetic hysteresis loop obtained at 273 K for the Gd metal and increasing magnetic moment with reducing temperature, are both signals of ferromagnetism—typical of Gd metal. Oxides or oxalates are paramagnetic, rather than ferromagnetic.

Furthermore, although the Examples used a picosecond pulsed laser, femtosecond lasers can also be used. The laser frequency is also crucial. IR lasers (as used in the Examples 1064 nm) have larger sample penetration depth but lower energy transmittance (slower conversion). While UV or shorter wavelength lasers typically have lower penetration but better energy transmittance (or faster dissociation). The selection of the laser frequency and parameters therefore depends on sample material, thickness and operational conditions. For purposes and illustration and not limitation, the pulsed laser can include but is not limited to Nd:YAG, Nd:YLF, Nd:YVO_4, YLF, LiCAF, LiLuF, LiSAF, etc. as they are relevant laser crystal media for UV to IR range femtosecond pulsed lasers. $CO_2$ lasers that are microsecond/continuous may likely not be applicable.

Figure 3:
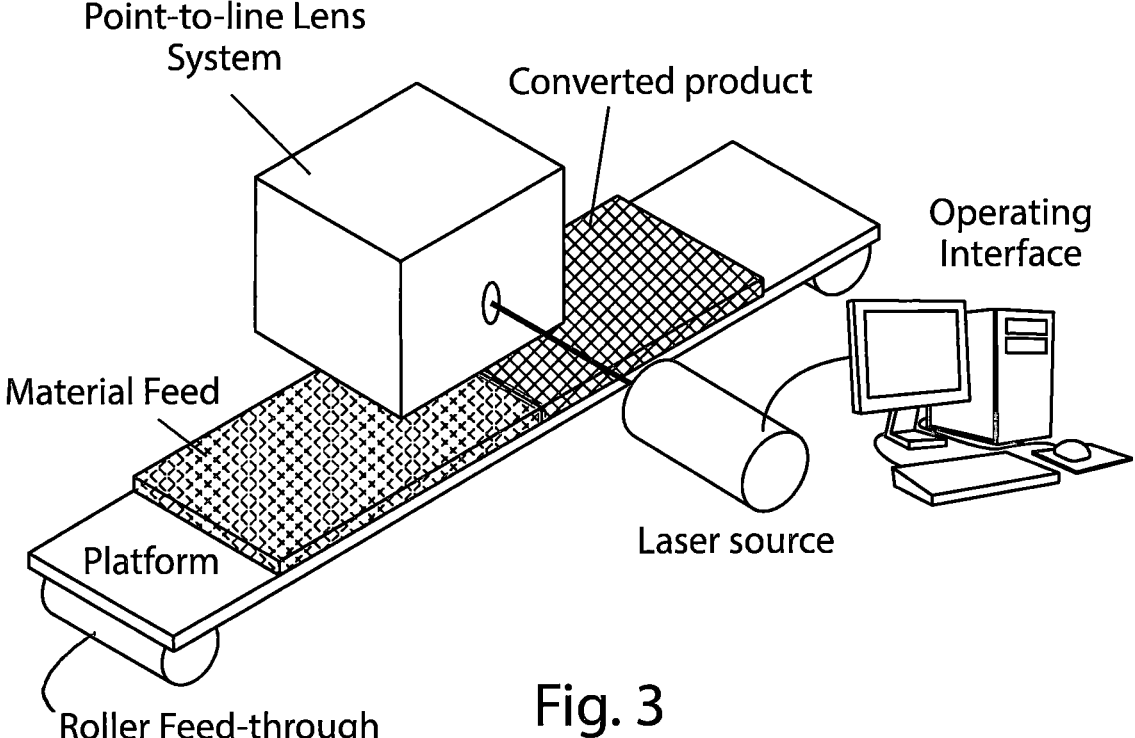
FIG. 3 is a schematic illustration of production apparatus for practicing a certain method embodiment of the present invention.

FIG. 3 is a schematic illustration of production apparatus for practicing RELAMPS method embodiments of the present invention offered for purposes of illustration and not limitation since other apparatus may be used. The apparatus comprises a roll-by-roll conversion mechanism wherein a line beam of the pulsed laser shaped via the point-to-line lens system will continuously convert REE-containing materials on a moving platform under an inert atmospheric condition to a REM.

Additional Examples

Certain other embodiments of the present invention involve selective separation of mixtures of rare earth salts (or other compounds and complexes) into a separate rare earth metal or metal alloy via reduction in the manner described above by using an appropriate selectively tuned pulsed laser wavelength to this end.

For purposes of illustration, the selective nature of light-matter interactions can be employed in advantageous manner towards the separations of mixed REE salts. The selective bond excitation wavelengths for different REE species are strongly correlated to their electronic configuration and oxidation state. In FIG. 4a, UV-Vis spectra of four RE acetates (Ce, La, Pr and Nd) demonstrate their select absorbance at different wavelengths between 900-190 nm. The peaks in the UV-Vis spectra indicate the specific wavelengths that induce electronic excitations corresponding to a given ionic species. Energetic excitations at these selective wavelengths would lead to molecular dissociation of the ionic species. The definitive and non-overlapping peaks established for Ce, Nd and Pr salts indicate the possibility of individual RE cationic excitation and consequent separations. The RELAMPS technology can be efficiently used for RE separations following the selective electronic excitation principle. From a mixed batch of the above-mentioned salts, Ce could be efficiently separated first at ~250 nm (FIG. 4a) by converting it to Ce metal. The selective separation of Ce, the primary element in most RE ores, significantly improves the concentration of the other elements. Nd and Pr could be subsequently separated by converting them to metals at the demarcated wavelengths (FIG. 4b). Other wavelengths (not shown) for selective separation of Pr from Nd are near 1064 and 1500 nm wavelengths. If Nd—Pr alloy metal is desired, as typically done industrially, the treatment can be performed near 590 nm wavelength. Finally, La could be separated at ~195 nm. In addition to Nd and Pr, Ce and La are now being used in magnets, which means that RELAMPS can also enable their separation from recycled magnet wastes. The ability to perform these separations solid-state using a tunable wavelength laser and under ambient conditions provide significant advantage in terms of versatility, energy efficiency, environmental friendliness and process economics over existing pyro-/hydrometallurgical methods.

Although the present invention has been described with respect to certain illustrative embodiments, those skilled in the art will appreciate that modifications and changes can be made therein without departing from the spirit and scope of the invention.

REFERENCES WHICH ARE INCORPORATED HEREIN BY REFERENCE

1 U. S. G. Survey, *Mineral Commodity Summaries,* 2018.
2 N. Swain and S. Mishra, *J. Clean. Prod.,* 2019, 220, 884-898.
3 F. H. Spedding and W. J. McGinnis, *Preparation of rare earth metals*, Ames, 1951.
4 A. Abbasalizadeh, A. Malfliet, S. Seetharaman, J. Sietsma and Y. Yang, J. *Sustain. Metall.,* 2017, 3, 627-637.
5 N. Swain and S. Mishra, "A review on the recovery and separation of rare earths and transition metals from secondary resources," *Journal of Cleaner Production*, vol. 220, pp. 884-898, May 2019, doi: 10.1016/j.jclepro.2019.02.094.

We claim:

1. A method of producing a rare earth metal, comprising impinging a precursor rare earth element-containing compound material in a sub-atmospheric processing chamber with a pulsed laser light controlled in a manner to reduce at least part of the rare earth element-containing compound material in the chamber to yield a rare earth metal.

2. The method of claim 1 wherein the precursor rare earth element-containing material comprises a rare earth compound or rare earth complex.

3. The method of claim 1 wherein the rare earth metal comprises at least one of La, Ce, Pr, Nd, Pr, Sm, Eu, Gd, Tb, Dy, Ho, Er, Tm, Yb and/or Lu.

4. The method of claim 2 wherein the precursor rare earth element-containing compound material comprises at least one of an oxide, hydroxide, oxalate, halide or other salts of the rare earth element.

5. The method of claim 1 wherein the rare earth element-containing compound material is at ambient temperature when impinged with the pulsed laser light.

6. The method of claim 1 wherein the rare earth element-containing compound material resides as a pressed powder body in the processing chamber having sub-atmospheric pressure during impingement with the pulsed laser light.

7. The method of claim 1 wherein the pulsed laser light is scanned across the rare earth element-containing material.

8. The method of claim 1 wherein the pulsed laser light is UV to IR light.

9. A method of producing a rare earth metal, comprising impinging a mixture of different constituent rare earth element-containing materials in a sub-atmospheric processing chamber with a pulsed laser light whose wavelength is tuned in a manner to selectively reduce at least one of the constituent rare earth element-containing materials of the mixture to yield a selected rare earth metal.

10. The method of claim 9 wherein the selected rare earth metal comprises at least one of La, Ce, Pr, Nd, Pr, Sm, Eu, Gd, Tb, Dy, Ho, Er, Tm, Yb and/or Lu.

11. The method of claim 9 wherein Ce metal is selectively produced.

12. The method of claim 9 wherein Pr metal is selectively produced.

13. The method of claim 9 wherein Nd metal is selectively produced.

14. The method of claim 9 wherein a metal alloy comprising Pr and Nd is selectively produced.

15. The method of claim 9 wherein La metal is selectively produced.

16. The method of claim 9 wherein the rare earth element-containing materials of the mixture comprise a rare earth oxide, rare earth hydroxide, rare earth oxalate, rare earth halide and/or other rare earth salts.

17. The method of claim 9 wherein the mixture of the rare earth element-containing materials resides as a pressed powder body in the processing chamber having the sub-atmospheric pressure during impingement with the pulsed laser light.

18. The method of claim 9 wherein the pulsed laser light is scanned across the mixture of rare earth element-containing materials.

19. The method of claim 9 wherein the pulsed laser light is UV to IR light.

\* \* \* \* \*